Oct. 9, 1956
E. J. SCHAEFER
2,765,638
RESILIENT COUPLING
Filed June 25, 1954
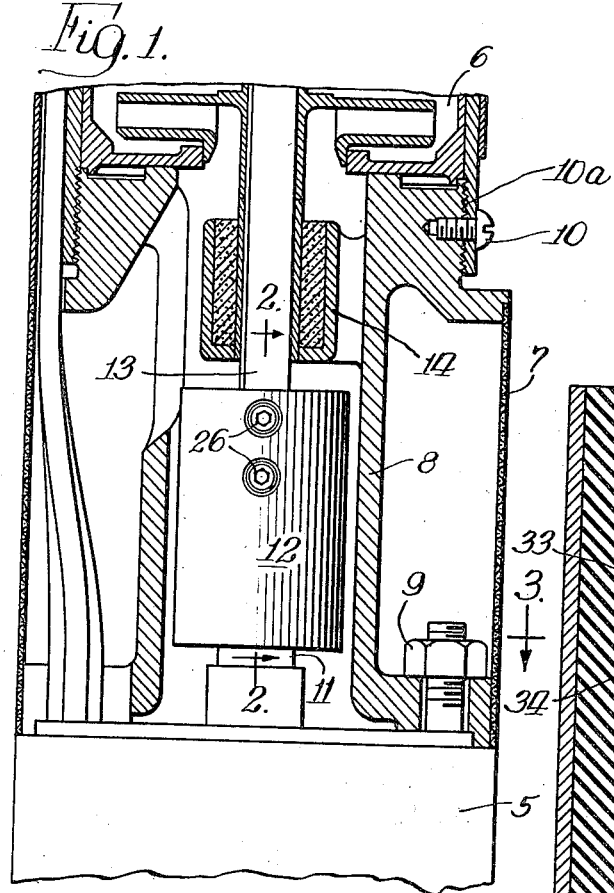
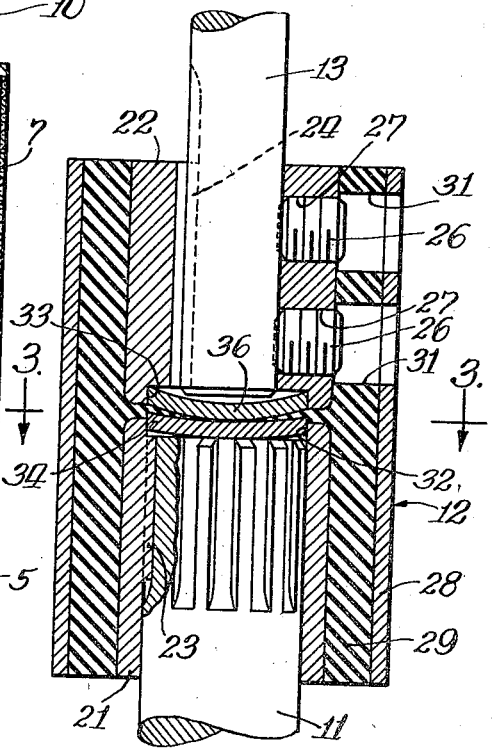
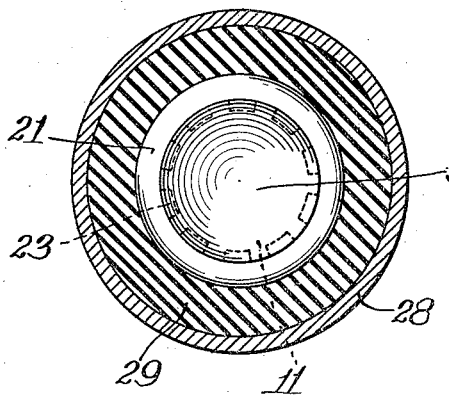
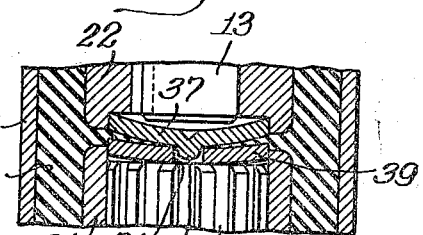
INVENTOR.
Edward J. Schaefer
BY
Davis, Lindsey, Hibben & Noyes
Attys.

United States Patent Office 2,765,638
Patented Oct. 9, 1956

2,765,638

RESILIENT COUPLING

Edward J. Schaefer, Fort Wayne, Ind.

Application June 25, 1954, Serial No. 439,263

7 Claims. (Cl. 64—11)

This invention relates to an improved coupling for a motor-pump unit, particularly a submersible pump unit such as used in an automatic pressure water system.

An automatic pressure water system comprises a motor driven pump arranged to pump water from the well and discharge it into an air cushioned pressure tank from which the water passes into various service lines. A pressure control is provided so that the pump is operated automatically as required to maintain a bulk supply of water under predetermined pressure whereby the water is ready for instant use at all times upon withdrawal through the service lines. At the present time there is an increasing demand for submersible pumps for use in such water systems, particularly in residential locations where quiet operation of the pump is important. Although a submersible pump is normally characterized by a relatively quiet operation, e. g. as compared with an installation where the pump and the motor are mounted above ground and adjacent the pressure tank, nevertheless, it is highly desirable to eliminate every possible source of noise.

Complaints of noisy operation from submersible pump installations usually arise where the well is rather close to a dwelling and the pipe from the pump emerges from the well casing close to the tank and has a rigid connection with the tank. Under such circumstances, any noise from the pump is transmitted through the discharge piping to the pressure tank at the ground level which acts as a noise amplifier. Although there may be several sources of noise in a submersible motor-pump unit, the present invention is directed primarily to the suppression of noise-producing vibrations emanating from the motor of the unit. In the usual small size submersible pump unit, the electric motor is of the single phase type. As is well known, the shaft torque of a single phase motor is not of uniform magnitude but instead varies cyclically at twice the frequency of the electrical supply. For example, in the case of a 60 cycle supply line, the motor torque will pulsate at a frequency of 120 cycles. Obviously, it is highly desirable to damp or suppress transmission of such torsional vibrations from the motor.

Accordingly, it is a primary object of the present invention to provide novel means for minimizing or substantially eliminating at least one source of noise in the operation of a submersible motor-pump unit.

Another object of the invention is to provide a novel noise-eliminating coupling means between the shaft of an electric motor and the complementary shaft of a mechanism driven by the motor.

A further object of the invention is to provide novel means in a submersible pump system for damping torsional vibrations emanating from the electric motor of the pump unit.

Other objects and advantages of the invention will become apparent from the subsequent detailed description taken in conjunction with the accompanying drawing, wherein:

Fig. 1 is a fragmentary vertical sectional view of a portion of a submersible pump unit including, in elevation, a resilient coupling means comprising one specific embodiment of the invention;

Fig. 2 is an enlarged vertical sectional view as taken along the line 2—2 of Fig. 1;

Fig. 3 is a horizontal sectional view taken along the line 3—3 of Fig. 2; and

Fig. 4 is a fragmentary vertical sectional view similar to Fig. 2 but showing a modification of the invention.

Referring first to Fig. 1 of the drawing, the invention is illustrated in connection with an elongated submersible pump unit having an electric motor section 5 and a superimposed multiple stage centrifugal pump section 6. A water intake having an inlet screen 7 is provided intermediate the motor section 5 and the pump section 6. A motor support and bearing housing 8 is bolted, as at 9, to the upper end of the electric motor section 5 and is secured, as by screws 10 and threads 10a, to the lower end of the pump section casing. The rotor shaft of the motor, designated at 11, extends upwardly into a resilient coupling unit 12 disposed in the support 8, and the pump shaft, indicated at 13, extends downwardly from the pump section 6 and is journaled in a bearing 14 rigidly carried in the support 8. Of course, the pump shaft 13 extends at its lower end into the coupling device 12 so as to provide the desired rotary driving conection between the respective motor and pump shafts.

The resilient coupling unit 12, described in detail below, takes the place of the conventional splined coupling or tongue and groove connection. By reason of its resilient and flexible characteristics, the coupling 12 damps and prevents transmission of torsional vibrations from the motor unit and also facilitates connection of the pump and motor shafts as will appear below.

Referring now to Figs. 2 and 3, the resilient coupling device 12 comprises a pair of tubular or sleeve bushings 21 and 22 which are substantialy aligned axially and are rigidly attachable to the motor shaft 11 and to the pump shaft 13, respectively, for rotation therewith. The lower bushing 21 is in this instance shown with a splined connection, as at 23, to the upper end of the motor shaft 11. The upper bushing 22 is illustrated in this case as being connected to the pump shaft 13 by means of a key 24 and a pair of set screws 26 having a threaded fit in a pair of complementary apertures 27 in the wall of the bushing 22. However, it will be understood that any suitable means of rigidly connecting the bushings to the respective drive and driven shafts may be utilized. The bushings 21 and 22 are also slightly spaced endwise or axially as will be evident from Fig. 2.

For resiliently interconnecting the bushings 21 and 22, I provide an outermost one-piece rigid sleeve 28 of metal or the like which surrounds the axially aligned bushings 21 and 22 and is substantially coextensive in length therewith. The outermost sleeve 28 is annularly spaced from the bushings 21 and 22 and interposed in this space is a generally tubular sleeve-like body 29 of a suitable resilient cushioning material such as rubber. The rubber element 29 is firmly bonded at its outer periphery to the interior of the sleeve 28 and is similarly bonded at its inner periphery to the exterior of the bushings 21 and 22 thereby drivingly and resiliently interconnecting the latter. Suitable openings, as at 31, are provided in the sleeve means 28—29 for permitting access to the set screws 26. Obviously, the driving torque from the motor shaft 11 is transmitted through the interconnected sleeve means 28—29 to the driven pump shaft 13, and the provision of the outermost rigid sleeve 28 prevents excessive shearing stresses in the rubber member 29. At the same time, the presence of the rubber 29 serves as a cushion between the shafts 11 and 13 so that torsional vibrations which may be transmitted through the motor shaft 11, as a result of the electrical phenomenon hereinbefore described, are effectively damped and absorbed. Consequently, the noise-producing torsional vibrations are prevented from being transmitted to the pump shaft 13 and thence through the pump discharge piping to the ground level.

To insure centering of the shafts 11 and 13 and also for accommodating slight angular misalignment therebetween, I prefer to utilize special coacting means at the adjacent terminal ends of the axially spaced bushings 21 and 22. In the illustrated embodiment of the invention the inner ends of the bushings 21 and 22 are formed with counterbore portions 32 and 33, respectively, into which are frictionally fitted a pair of dished elements or concavo-convex disks 34 and 36 respectively, thereby forming with the bushings a pair of generally cup-shaped members fitted over the ends of the shafts. The disk elements 34 and 36 have coacting concave and convex outer surfaces which are in engagement axially of the shafts for obtaining centering thereof. To facilitate and promote such centering, the coacting curved surfaces of the disk elements preferably have different radii of curvature, the radius of the concave surface being greater so as to establish a minimum area of contact substantially at the axis of the shafts. In the present instance, the radius of the upper disk element 36 with its convex outer surface is less than the radius of the lower disk 34 with its concave outer surface.

Moreover, it will also be seen that the rubber comprising the sandwiched body 29 extends inwardly between the opposed axially spaced ends of the bushings 21 and 22 and also to some extent between the disk elements 34 and 36 so as to provide a further axial cushioning effect. It will be apparent that the rubber 29 is sufficiently compressible to permit relative angular displacement between the shafts and their attached bushings 21 and 22 thereby providing a flexible connection which functions to a limited extent in the manner of a universal connection and accommodates slight angular misalignment between the shafts.

In addition to the centering effect described above, the disks 34 and 36 also prevent the rubber 29 from entering and fouling the shaft cavities or bores of the bushings 21 and 22 during bonding and molding of the unitary coupling device.

In Fig. 4 I have illustrated a modification of the disk arrangement which may be advantageous in some instances. The sleeve 28, the rubber 29, and the bushings 21 and 22 are the same as in the previous embodiment of the invention. However, the upper disk element fitted in the bushing 22 is designated at 37 and has a central depending boss or protuberance 38. The lower disk element, indicated at 39, is provided with a central aperture 41 which receives the protuberance 38 in free but close-fitting relation. The concave-convex relationship between the disks remains substantially the same as in the first described embodiment.

The coacting protuberance and aperture arrangement in the disk elements is of particular importance in the case of certain motor-pump units wherein no lower pump bearing, such as the bearing 14, is provided. In such case, the bushings 21 and 22 of the coupling device 12 may settle into slight misalignment as a result of unequal shrinkage of the rubber 29 or other causes. Without the benefit of a bearing at the lower portion of the pump to correct this slight misalignment, there may be a tendency for the pump shaft 13 to rotate eccentrically. This undesirable condition is corrected by the aligning coaction between the centrally located protuberance 38 and aperture 41 in the dished disk elements 37 and 39. In other words, this arrangement holds the bushings 21 and 22 in substantial alignment at the point of contact or operative engagement between the disk elements, and beyond this region the motor and pump shafts 11 and 13 are of themselves sufficient to maintain the bushings 21 and 22 in axial alignment. The protuberance or boss 38 is preferably quite small in diameter in order to minimize the area of frictional contact and thereby prevent transmission of torsional vibrations.

Although the invention has been described with particular reference to certain specific structural embodiments thereof, it will be understood that various modifications and equivalent structures may be resorted to without departing from the scope of the invention as defined in the appended claims.

I claim:

1. Resilient coupling means for a pair of shafts comprising a pair of axially disposed sleeve bushings adapted to be rigidly secured to the adjacent ends of the respective shafts, said bushings having coacting concave and convex end wall portions in axial engagement for centering the shafts, a rigid sleeve around the outside of said bushings and spaced annularly therefrom, and elongated generally tubular means of resilient material secured to the inside of said sleeve and to the outside of said bushings for resiliently coupling the latter and retarding the transmission of torsional vibrations between the shafts, the portions of said tubular means lying between each of said bushings and the corresponding regions of the sleeve carrying all of the torque load between the bushings without any substantial transverse shear in said tubular means.

2. Resilient coupling means for a pair of shafts comprising a pair of axially disposed sleeve bushings adapted to be rigidly secured to the adjacent ends of the respective shafts, said bushings having coacting concave and convex end wall portions in axial engagement for centering the shafts, a rigid tubular one-piece sleeve surrounding both of said bushings and spaced annularly therefrom, and generally tubular means of resilient material interposed between and secured to said sleeve and said bushings for resiliently coupling the latter and carrying the torque load therebetween, the length of said sleeve relative to the bushings being such that the opposite ends of the sleeve extend beyond and overlap the inner ends of the bushings sufficiently to eliminate any substantial transverse shear in said tubular means while carrying the torque load.

3. Resilient coupling means for a pair of shafts comprising a pair of axially disposed sleeve bushings adapted to be rigidly secured to the adjacent ends of the respective shafts, said bushings having coacting concave and convex end wall portions in axial engagement for centering the shafts, an elongated one-piece metal sleeve surrounding said bushings and spaced annularly therefrom, said sleeve having an axial length substantially the same as the combined axial length of the aligned bushings, and a generally tubular rubber body substantially coextensive in length with said sleeve and disposed concentrically between said sleeve and said bushings, the rubber being firmly bonded to the interior of said sleeve and to the exterior of said bushings for drivingly connecting the latter whereby said rubber body carries the torque load between the bushings without any substantial transverse shear in the rubber body while at the same time providing a resilient cushion for retarding transmission of torsional vibrations between the shafts.

4. The structure of claim 1 further characterized in that the radius of curvature of the concave end wall portion is greater than the radius of curvature of the convex end wall portion whereby to facilitate centering of the shafts.

5. Resilient coupling means for a pair of shafts comprising a pair of axially disposed tubular bushings adapted to be secured to the adjacent ends of the respective shafts for rotation therewith, a pair of disk elements secured to the outer ends of said bushings and adapted to overlie the axial ends of the shafts, said disk elements having coacting convex and concave portions in engagement for facilitating centering of the shafts, and outermost sleeve means for interconnecting said bushings and including a generally tubular rubber body secured to the outside of said bushings for resiliently coupling the same.

6. The structure of claim 5 further characterized in that said disk elements each have a dished concavo-convex shape with different radii and are frictionally fitted in the ends of said bushings.

7. Resilient coupling means for a pair of shafts comprising a pair of axially disposed tubular bushings adapted to be rigidly secured to the adjacent ends of the respective shafts, a pair of disk elements secured to the outer ends of said bushings and adapted to overlie the axial ends of the shafts, said disk elements having coacting convex and concave portions in axial engagement for facilitating centering of the shafts, one of said disk elements also having a central opening and the other of said disk elements having a coacting axial protuberance received in free but close-fitting relation in said opening whereby to obtain axial alignment between the opposed ends of said bushings, and outermost sleeve means for interconnecting said bushings and including a generally tubular rubber body secured to the outside of said bushings for resiliently coupling the same.

References Cited in the file of this patent
UNITED STATES PATENTS

| | | |
|---|---|---|
| 1,883,203 | Whitehouse | Oct. 18, 1932 |
| 2,608,840 | Lahaie | Sept. 2, 1952 |